United States Patent [19]
Nicholson

[11] Patent Number: 5,161,776
[45] Date of Patent: Nov. 10, 1992

[54] HIGH SPEED ELECTRIC VALVE

[76] Inventor: Robert D. Nicholson, 563 Wellesley Dr., Birmingham, Mich. 48009

[21] Appl. No.: 653,169

[22] Filed: Feb. 11, 1991

[51] Int. Cl.⁵ .............................................. F16K 31/40
[52] U.S. Cl. .................................. 251/30.05; 251/77; 280/737; 280/742
[58] Field of Search .................. 251/75, 30.05, 129.19, 251/77; 137/469; 280/737, 742

[56] References Cited

U.S. PATENT DOCUMENTS

| | | |
|---|---|---|
| 2,676,779 | 4/1954 | Boden et al. ............ 251/75 X |
| 3,095,901 | 7/1963 | Larson et al. . |
| 3,661,299 | 5/1972 | Durstewitz . |
| 3,788,596 | 1/1974 | Maeda . |
| 3,910,314 | 10/1975 | Nicholson . |
| 3,980,270 | 9/1976 | Thomas . |
| 4,203,616 | 5/1980 | Okada . |
| 4,275,901 | 6/1981 | Okada . |
| 4,289,327 | 9/1981 | Okada . |
| 4,332,368 | 6/1982 | Woloszczuk . |
| 4,771,914 | 9/1988 | Kaneda et al. . |
| 4,844,559 | 7/1989 | Harrison . |

FOREIGN PATENT DOCUMENTS 1116139  1/1982  Canada .
932063  5/1982  U.S.S.R. .............. 251/129.19

Primary Examiner—Arnold Rosenthal
Attorney, Agent, or Firm—Harness, Dickey and Pierce

[57] ABSTRACT

A fast-acting solenoid actuated valve assembly is disclosed which utilizes a pressure biased primary valve member and a secondary solenoid actuated valve member. The solenoid is operative to initially partially open the secondary valve member to thereby vent the primary valve pressure biasing to thereby enable opening of the primary valve. The secondary valve member is moved to a fully open position by the force generated by the initial venting of the biasing pressure. The speed of operation of the present valve assembly renders it particularly well suited for use in motor vehicle air bag assemblies. Actuating circuits are also disclosed for actuating the valve assembly.

18 Claims, 2 Drawing Sheets

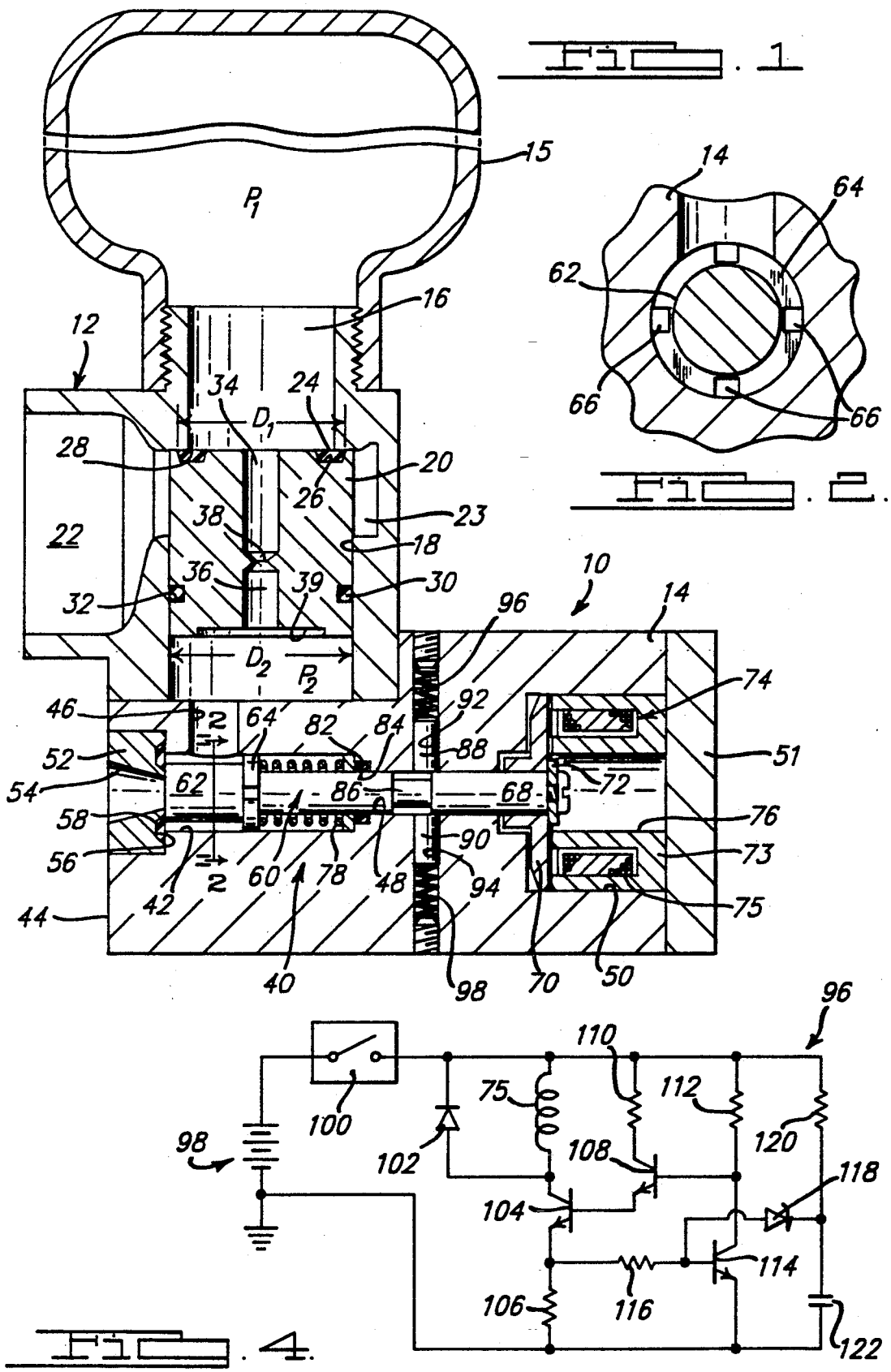

HIGH SPEED ELECTRIC VALVE

BACKGROUND AND SUMMARY OF THE INVENTION

The present invention relates generally to valve assemblies and more specifically to high speed valve assemblies for use in connection with air bag inflation apparatus.

In recent years efforts have been made to incorporate air bags into motor vehicles in order to reduce the possibility of injury to occupants of the vehicle in the event of an accident. Typically, these air bags incorporate an uninflated air bag or bladder, a source of pressurized gas and means for rapidly inflating the air bag or bladder from the source of pressurized gas in the event the vehicle is subjected to a high rate of deceleration such as occurs during an accident. While solenoid operated valves are extremely reliable, to date these types of valves have not been utilized in such air bag systems because they have been too slow acting to enable proper inflation of the air bag.

The present invention, however, provides a solenoid operated valve assembly which is capable of sufficiently fast operation so as to render it suitable for use in connection with such air bag systems. The solenoid valve of the present invention includes a primary valve member retained in a closed position by means of a fluid pressure and a secondary solenoid actuated valve member operative to control release of the holding fluid pressure acting on the primary valve member. Circuit means are also provided for controlling actuating current flow to the solenoid in response to a sensed impact upon the vehicle. Upon energization of the solenoid, the solenoid operates to initially open the secondary valve slightly thereby allowing fluid pressure to begin venting. This initial fluid flow results in an increased opening pressure being exerted on the secondary valve member thereby rapidly moving it to a further fully open position which immediately releases the closing fluid pressure acting on the primary valve member. The primary valve member will then be moved into a fully open position thereby allowing the pressurized gas contained within a reservoir to inflate the air bag so as to provide a cushion for the vehicle occupants.

Because the solenoid is only required to move the secondary valve member a relatively small distance, the size thereof may be kept small thus enhancing the speed of operation thereof. Further, because the secondary valve member is utilized to control release of the primary valve biasing pressure, it too can be of a relatively small size thereby facilitating rapid operation. By placing the secondary valve member in close proximity to the primary valve member, the volume of pressurized fluid required to be vented may be kept small thus allowing rapid venting of same without requiring a large vent passage.

The use of a combination solenoid and pressure actuated valve assembly of the present invention offers many significant advantages over presently existing systems. For example, design flexibility is greatly increased because the pressure reservoir and associated actuating valve assembly can be located in areas remote from the air bags themselves. This thus allows greater freedom in the placement of the air bags within the vehicle as well as increased freedom of placement for other vehicle components etc. which may be positioned in the same area as the stored air bags. Further, the present invention enables a single reservoir to be utilized to fill multiple air bags simultaneously if desired. Also, because the system of the present invention is reusable, it does not need to be replaced in the event of deployment during an accident but rather can be recharged. This may contribute significantly to reducing repair costs. Further, the system is well suited for periodic servicing and operational readiness inspection should these be desired.

Additional advantages and features of the present invention will become apparent from the subsequent description and the appended claims taken in conjunction with the accompanying drawings.

BRIEF DECRIPTION OF THE DRAWINGS

FIG. 1 is a section view of a valve assembly and associated pressure reservoir in accordance with the present invention.

FIG. 2 is a section view of the valve assembly of FIG. 1, the section being taken along line 2—2 thereof.

FIG. 4 is a schematic diagram of an actuating circuit for use in connection with the valve assembly of FIG. 1, all in accordance with the present invention.

DESCRIPTION OF THE PREFERRED EMBODIMENTS

Figure 3:
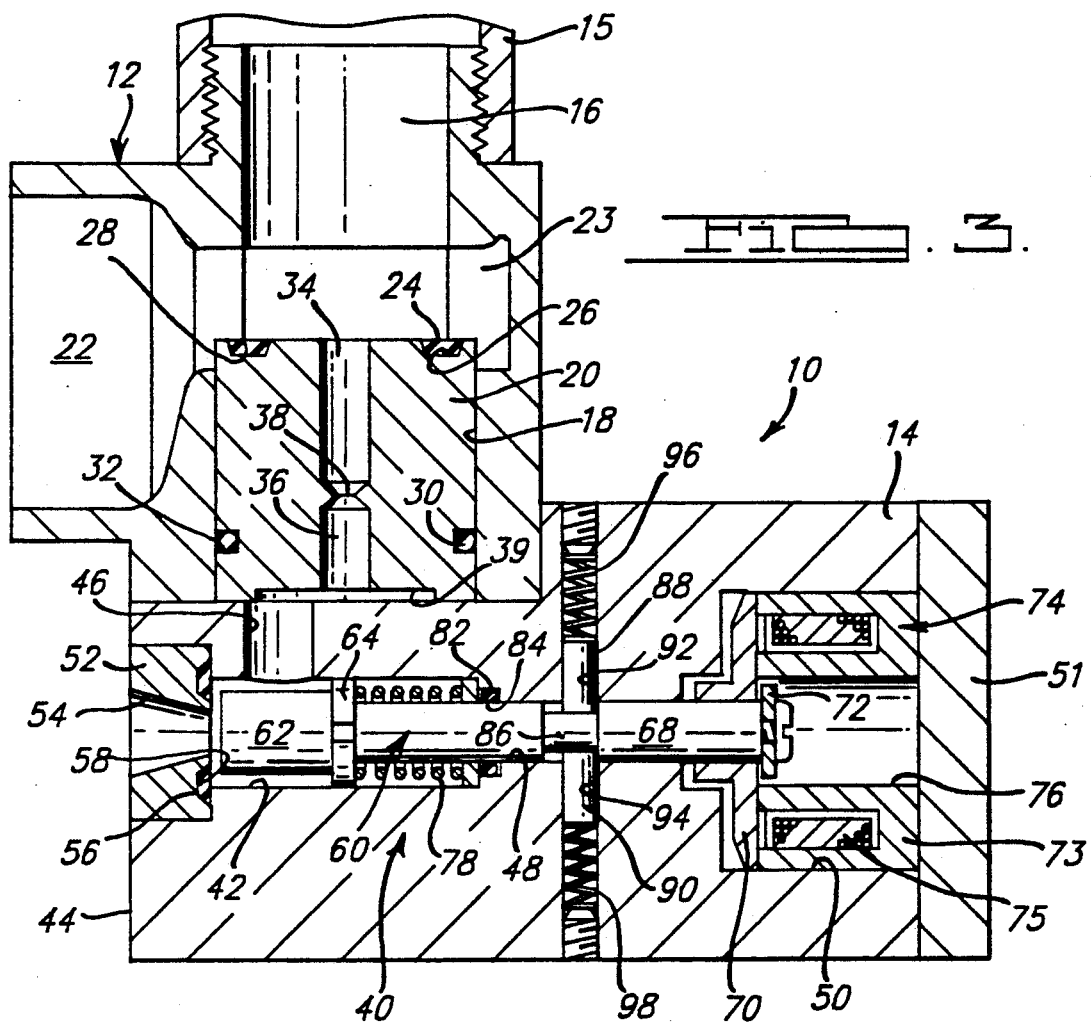
FIG. 3 is a view similar to that of FIG. 1 but showing the valve assembly in an actuated open position.

Referring now to the drawings and more specifically to FIG. 1, there is shown a valve assembly 10 in accordance with the present invention having a pressurized fluid reservoir 15 coupled thereto. Valve assembly 10 includes an upper housing portion 12 within which a primary valve assembly is disposed and which is suitably secured to a lower housing portion 14 within which a secondary valve assembly is disposed.

Upper housing 12 has an inlet opening 16 at one end thereof to which a fluid reservoir 15 is connected. Inlet opening 16 opens into an enlarged diameter elongated bore 18 within which a piston 20 is axially movably disposed. An outlet opening 22 of substantial size is also provided opening into bore 18 through a sidewall thereof adjacent the juncture between enlarged diameter bore 18 and inlet opening 16. Preferably an annular recess 23 will be provided in the sidewall of bore 18 through which opening 22 may communicate and which serves to increase the area of communication between bore 18 and opening 22 during initial opening movement of piston 20. It should be noted that while reservoir 15 is shown being directly connected to valve assembly 10, it may alternatively be remotely located and interconnected with valve assembly via suitably sized fluid conduit. In such an arrangement, the interconnecting fluid conduit must be sufficiently large to assure a sufficiently high volume of flow to accomplish the air bag inflation within the required time frame.

In order to effectively close off opening 16 so as to prevent fluid leakage from reservoir 15, piston 20 is provided with an annular seal 24 fitted within a suitable recess 26 provided in one end thereof which seal is adapted to engage end wall 28 of bore 18 when piston 20 is in a closed position as shown in FIG. 1. A second annular seal 30 is fitted within an annular groove 32 provided in a sidewall of piston 20 adjacent the lower (as shown) end thereof. Piston 20 also has a pair of axially aligned first and second relatively small diameter passages 34 and 36 extending axially inwardly from opposite ends thereof. Passages 34 and 36 are interconnected via a reduced diameter restricted portion 38 disposed therebetween. The lower end of passage 36 opens into an enlarged diameter recess 39 provided in the bottom of piston 20.

A secondary solenoid actuated valve assemble 40 is disposed within lower housing portion 14 and includes an axially elongated bore 42 extending inwardly from sidwall 44 thereof. A radially extending passage 46 operates to place passage 42 in fluid communication with the lower portion of bore 18 provided in upper housing portion 12. A reduced diameter passage 48 forms a continuation of bore 42 and opens into a relatively large diameter solenoid chamber 50. A plate member 51 is secured to housing 14 and serves to close off the open end of chamber 50.

A valve seat insert 52 is fitted within an enlarged diameter portion provided at the outer end of bore 42. Valve seat insert 52 includes a conically shaped opening 54 of an increasing diameter in an outward direction and an annular ring-shaped elastomeric sealing member 56 fitted within an annular groove 58 provided on the inner surface of insert 52.

An axially elongated valve member 60 is movably positioned within bore 42 and includes a first generally cylindrically shaped portion 62 adapted to seat against valve seat insert 52 and sealingly engage elastomeric sealing ring 56. Preferably portion 62 is of a diameter smaller than bore 42. An enlarged diameter guide portion 64 is provided at the end of portion 62 remote from seal 56 and serves to guidingly support valve member 60 within bore 42. A plurality of circumferentially spaced axially extending slots or recesses 66 are provided on the periphery of guide portion 64 to avoid a pressure differential thereacross during operation of valve assembly 40. Thus the entire area of bore 42 will be at substantially the same pressure.

Valve member 60 also includes an elongated shaft portion 68 extending through bore 48 into solenoid chamber 50. A relatively large diameter disk shaped armature member 70 is slidably secured to the end of shaft portion 68 by means of suitably sized washer-like element 72. Element 72 serves to limit axial movement of armature 70 relative to shaft 68 to the right as shown but yet allow shaft member 68 to slide through armature 70. A solenoid 74 is also disposed within chamber 50 and includes a stator 73 having a central bore 76 through which shaft 68 may move during operation of valve assembly 40 and a coil 75. As shown, the inner end of stator 73 will be slightly spaced from and axially aligned with armature 70 when valve assembly 40 is in closed position as shown in FIG. 1.

In order to bias valve member 60 into the closed position as shown in FIG. 1, helical coil spring 78 is provided being positioned in bore 42 in surrounding relationship to shaft portion 68. Spring 78 has one end bearing against guide portion 64 and the other end seated against a spring seat member 80 fitted against the end wall of bore 42. Spring seat 80 also serves to limit movement of a seal 82 fitted within recess 84 so as to prevent fluid leakage through passage 48.

Shaft 68 also includes a reduced diameter portion 86 positioned intermediate the ends thereof. A pair of diametrically opposed plungers 88 and 90 are positioned within radially extending bores 92, 94, respectively. A pair of springs 96, 98 are disposed with bores 92, 94, respectively, and serve to urge plungers 88 and 90 radially inwardly into engagement with shaft portion 68 adjacent reduced diameter portion 86 thereof. Preferably springs 96, 98 will be relatively weak springs so as to minimize the frictional drag exerted on shaft portion 68 by plungers 88 and 90 during actuation of valve member 60.

In a static unactuated condition, reservoir 15 will be at a relatively high pressure $P_1$. Also, the pressure $P_2$ in the lower portion of bore 18 will be equal to the pressure $P_1$ due to the communication provided across piston 20 by passages 34, 36 and restriction 38. The effective area of piston 20 against which pressure $P_1$ acts will encompass the open area defined by passage 16 as well as substantially all of the area occupied by seal 24. Because the diameter $D_1$ of this effective area is smaller than the diameter $D_2$ of bore 18 and hence the diameter of piston 20, the surface area of piston 20 against which the pressure $P_1$ within reservoir 15 acts will be less than the surface area against which pressure $P_2$ acts. Therefore, this differential in surface area will result in a net force operative to maintain piston 20 in a closed position as shown in FIG. 1. Because bore 42 is in fluid communication with bore 18 via passage 46, the pressure therein will be substantially equal to pressure $P_2$. As the area within seal 58 is greater than the area within seal 82 and both these areas are subjected to substantially atmospheric pressure which is well below pressures $P_1$ and $P_2$, there will be a net pressure created force acting in concert with spring 78 to bias and maintain valve member 60 in a closed position.

Upon energization of solenoid 74, the magnetic field created thereby will initially draw armature 70 to the right (as viewed in FIG. 1) thereby causing valve member to move out of engagement with valve seat 52. Preferably the amount of movement of armature 70 and hence valve member 60 will be only slightly greater than that necessary to relieve the compression of seal 58. The initial fluid flow between the opposed end faces of valve seat 52 and valve member 62 will result in an axially directed pressure force being exerted upon valve member 60 thereby effecting a rapid further movement of valve member 60 to the right to thereby increase the opening between valve portion 62 and seat 52 thereby rapidly reducing the pressure within bore 42 as well as pressure $P_2$ in the lower portion of bore 18. As restriction 38 limits fluid flow across piston 20, the pressure $P_2$ will rapidly decrease thereby enabling the pressure $P_1$ in reservoir 15 to force piston 20 downwardly thereby placing reservoir 15 in open communication with exhaust passage 22 and allowing the associated air bag to be rapidly inflated.

Once valve member 60 has moved out of engagement with valve seat 52, springs 92 and 94 will cause plungers 88, 90 to move into reduced diameter portion 86 of shaft 68 and to cooperate therewith to prevent portion 62 from reengaging valve seat 52. It should be noted that the width and positioning of portion 86 relative to plungers 88 and 90 will be such that plungers 88 and 90 will not restrict nor limit maximum opening movement of valve member 60 but will prevent reclosing thereof.

It should also be noted that because armature 70 is slidably mounted on shaft portion 68, it will not limit opening movement of valve member 60. Additionally, the spacing between stator 74 and armature 70 will be just slightly greater than the distance required to release the slight compression of seal 56 and insure that portion 62 is moved out of engagement therewith. Thus, as shown in FIG. 3, a gap will occur between armature 70 and element 72 which will be many times greater than the initial gap between armature 70 and stator 73. Because the solenoid is only required to provide the initial opening or cracking movement of valve member 60, it is possible to use a relatively small stator and coil assembly which facilitates the speed with which the flux field is established. In order to further increase this speed, it is preferable that the stator and armature be made of a material which exhibits high magnetic permeability as well as high electrical resistivity so as to inhibit eddy currents. An alloy of equal parts nickel and iron is presently preferred for this purpose.

Because the coil employed with solenoid 74 is relatively small, it is preferable to include means for limiting the current flow thereto. Accordingly, an actuating circuit for accomplishing this objective is illustrated and will be described with reference to FIG. 4.

As shown therein, current limiting actuating circuit 96 comprises a power source such as a motor vehicle battery 98 having one terminal connected to a suitable impact detection circuit 100 which acts as a switch to actuate the remaining circuit. Such impact actuating circuits are presently available and hence no further description thereof is believed necessary. A diode 102 is connected in parallel with the coil 75 each of which is also connected to the output of the impact detection circuitry. The other ends of coil 75 and diode 102 are connected to the collector of transistor 104. The emitter of transistor 104 is connected to ground through resistor 106. A second transistor 108 is provided having its collector connected to the impact detection circuit output via resistor 110, its emitter connected to the base of transistor 104 and its base connected to the impact detection circuit via resistor 112. A third transistor 114 has its collector connected to the base of transistor 108, its emitter connected to ground and its base connected to the emitter of transistor 104 via resistor 116. A zener diode 118 has one terminal connected to the base of transistor 114 and the other terminal connected to the impact detection circuit 100 via resistor 120. A capacitor 122 is also connected between the zener diode and ground.

In operation, once the impact detection circuitry has been actuated, current will flow through resistor 112 into the bases of transistors 108 and 104 through resistor 106 to ground which will result in both transistors 108 and 104 being turned on. Current will then start to build up through solenoid coil 75. When a sufficient current flow through resistor 106 results in a predetermined voltage drop thereacross (i.e. approximately 0.6 volts), current will flow through resistor 116 into the base of transistor 114 thereby turning it on which in turn will reduce the current flowing into the base of transistor 108 thereby turning it partially off. Upon a steady state condition being reached, an equilibrium will be established with the desired current flowing into the base of transistor 108 to insure the required voltage drop across resistor 116 which will correspond to the desired current flow through coil 75 which current flow may be matched to the rating for the specific coil being utilized. Coil 75 will then operate to generate a magnetic flux thereby effecting axial opening movement of valve member 60. It should be noted that because of the relatively large voltage available as compared to the current flow required for operation of solenoid 74, a magnetic flux sufficient for actuation of valve member 62 will be created very rapidly.

Simultaneously with the closing of the impact actuation circuit, capacitor 122 will begin charging through resistor 120. Once the voltage across capacitor 122 reaches the zener voltage of zener diode 118 plus the voltage between the base and emitter of transistor 114, the capacitor will be fully charged and current will then flow through zener diode 118 into the base of transistor 114 thereby turning it further on which in turn will turn transistors 104 and 108 off thereby interrupting the continued actuating current flow. At this point current flowing through solenoid coil 75 will circulate through diode 102 until it is dissipated.

For a typical 12 volt motor vehicle system and a coil 75 having approximately ¼ Ohm resistance, it is believed the following values will result in satisfactory performance. Transistors 104, 108 and 118 may be of any suitable type and power rating.

| | |
|---|---|
| Resistor 106 | .03 Ohms |
| Resistor 110 | 25 Ohms |
| Resistor 112 | 1.2K Ohms |
| Resistor 116 | 500 Ohms |
| Resistor 120 | 18K Ohms |
| Capacitor 122 | 8 μf |
| Zener diode 118 | 6 V |

Figure 5:
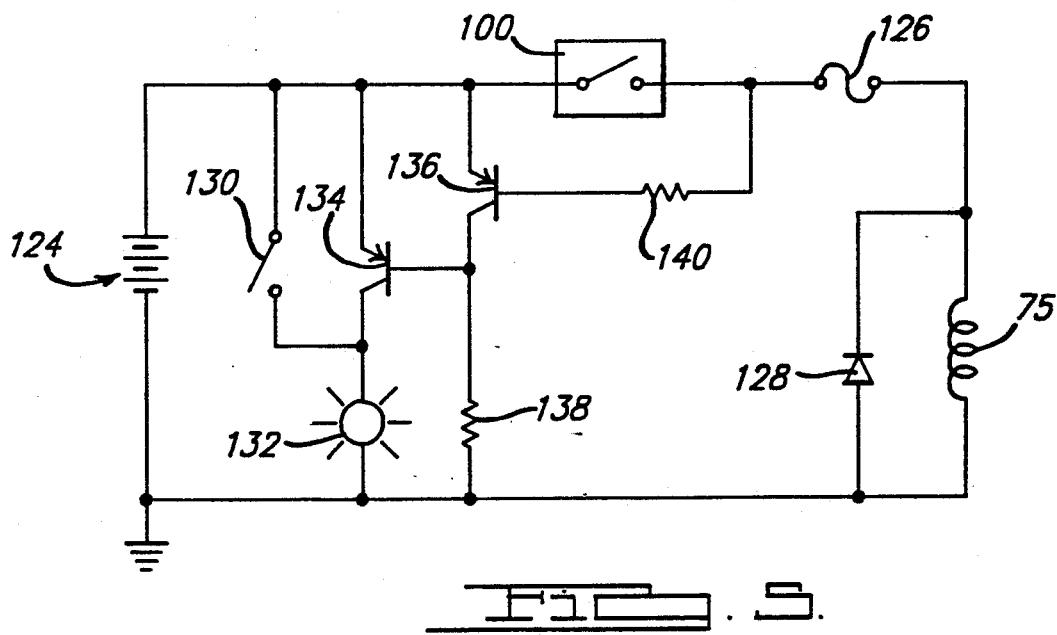
FIG. 5 is a schematic diagram of another embodiment of an actuating circuit for use in connection with the valve assembly of FIG. 1.

Alternatively, FIG. 5 illustrates another circuit wherein current flow to coil 75 is limited by means of a fuse. In this circuit, a power source 124 is provided having an impact detection circuit connected in series with coil 75 and a suitably rated fuse 126. A diode 128 is also connected across coil 75.

The circuit of FIG. 5 also incorporates dual fault detection circuitry which may be employed to illuminate a warning light on the vehicle dashboard if desired. To this end a pressure switch 130 is connected in series with a dashboard warning light 132. The pressure responsive switch will preferably be responsive to low pressure within reservoir 15 thereby alerting the operator of a need to service the air bag system.

A second fault detection circuit means is also incorporated in the embodiment of FIG. 5 to signal an open fuse condition. This second fault detection circuit comprises a first transistor 134 having the emitter connected to the power source and the collector connected in series with the warning light 132. A second transistor 136 also has its emitter connected to the power source and its collector connected both to ground via resistor 138 and to the base of transistor 134. The base of transistor 136 is connected to the output side of the impact detection circuit via resistor 140. In operation, this fault detection circuit will allow a small amount of current to flow through the fuse 126 and coil 75 during operation of the motor vehicle which current flow will operate to maintain transistor 134 in an off condition. In the event of an open fuse condition, this current flow will be interrupted and transistor 134 will be turned on thereby illuminating the dashboard warning light.

As may now be appreciated, the present invention offers an extremely fast acting valve assembly which, because of its quick response time, is exceedingly well suited for use in motor vehicle air bag systems. The valve assembly of the present invention eliminates the need to carry on board gas generating means and offers greater design flexibility because a single pressure reservoir may be utilized to supply multiple air bags. Further, greater flexibility in both placement of the air bags as well as in placement of the pressure reservoir is afforded by the present invention.

While it will be apparent that the preferred embodiments of the invention disclosed are well calculated to provide the advantages and features above stated, it will be appreciated that the invention is susceptible to modification, variation and change without departing from the proper scope of fair meaning of the subjoined claims.

I claim:

1. A valve assembly comprising:
   a housing having a chamber containing a pressurized fluid provided and an outlet opening;
   a valve member disposed within said housing and movable between a first valve member position wherein said valve member sealingly engages a valve seat provided within said housing to prevent fluid communication between said chamber and said outlet and a second valve member position wherein said valve member is in an open position to thereby place said chamber in fluid communication with said outlet opening;
   actuating means including a portion directly slidingly coupled to said valve member, said portion being movable from a first actuating means position to a second actuating means position to initially effect movement of said valve member from said first valve member position to a third valve member position intermediate said first and second valve member positions, said valve member being movable from said third valve member position to said second valve member position in response to a force resulting from flow of said pressurized fluid between said valve member and said valve seat while said actuating means and said portion remain in said second actuating means position.

2. A valve assembly as set forth in claim 1 wherein said actuating means comprise a solenoid including a stator secured within said housing and said portion comprises an armature secured to said valve member.

3. A valve assembly comprising:
   a housing having a chamber containing a pressurized fluid provided therein and an outlet opening;
   a valve member having an elongated shaft portion disposed within said housing and movable between a first valve member position wherein said valve member sealingly engages a valve seat provided within said housing to prevent fluid communication between said chamber and said outlet and a second valve member position wherein said valve member is in an open position to thereby place said chamber in fluid communication with said outlet opening;
   actuating means associated with said valve member, said actuating means comprising a solenoid including a stator secured within said housing and an armature secured to said valve member, said armature being slidably movably mounted on said shaft portion and being movable from a first actuating means position to a second actuating means position to initially effect movement of said valve member from said first valve member position to a third valve member position intermediate said first and second valve member positions, said valve member being movable from said third valve member position to said second valve member position in response to a force resulting from flow of said pressurized fluid between said valve member and said valve seat while said actuating means remains in said second actuating means position.

4. A valve assembly as set forth in claim 3 further comprising stop means, said stop means being operative to limit movement of said armature relative to said valve member in a direction from said first actuating means position to said second actuating means position.

5. A valve assembly as set forth in claim 1 wherein said valve assembly includes a second valve member, a second outlet opening and a second chamber containing a pressurized fluid, said second valve member being operative to prevent fluid communication between said second chamber and said second outlet when in a first position and to place said second chamber in communication with said first chamber when in a second position.

6. A valve assembly as set forth in claim 5 wherein said second valve member is biased into said first position by said pressurized fluid.

7. A valve assembly as set forth in claim 5 wherein said second valve member is movable from said first position to said second position in response to venting of said chamber via said outlet opening upon movement of said first valve member from said first position to said second position.

8. A valve assembly as set forth in claim 7 wherein said second valve member includes passage means for placing said first and second chambers in fluid communication.

9. A valve assembly as set forth in claim 8 wherein said passage means includes means defining a restriction therein.

10. A valve assembly as set forth in claim 2 wherein said stator and armature are fabricated from a material with both high permeability and high resistivity whereby the time required to establish a magnetic flux field may be minimized.

11. A valve assembly as set forth in claim 10 wherein said solenoid includes a coil and circuit means for energizing said coil to thereby establish said magnetic field, said circuit means being operative to limit current flow through said coil.

12. A valve assembly as set forth in claim 11 wherein said circuit means include transistors for limiting said current flow through said coil.

13. A valve assembly as set forth in claim 11 wherein said circuit means include a fuse for limiting current flow through said coil.

14. A valve assembly comprising:
   a housing having an inlet opening and first and second discharge openings provided therein;
   a supply of pressurized fluid connected to said inlet opening;
   a first valve member disposed within said housing and movable between a closed position wherein fluid communication between said inlet and said first discharge opening is prevented and a second position wherein said inlet and said first discharge opening are in fluid communication;
   a pressurized fluid within said housing for biasing said first valve member into said closed position;
   a second valve member disposed within said housing and being movable between a closed position wherein said second discharge opening is closed off and an open position wherein said second discharge passage is in fluid communication with said pressurized biasing fluid for venting same therethrough;

actuating means within said housing, said actuating means including a solenoid having a stator, a coil and associated circuit means operative to create a magnetic flux field around said stator, an armature, and means for mounting said armature on said second valve member, said mounting means being operative to enable said armature to effect movement of said second valve member a predetermined distance to effect an initial cracking of said second valve member in response to creation of said magnetic field whereupon said biasing fluid pressure is operative to effect further movement of said second valve member relative to said armature in excess of said predetermined distance to said open position whereby said biasing fluid pressure is released through said second discharge opening and said first valve member is moved into said open position.

15. A valve assembly as set forth in claim 14 wherein said circuit means include transistor means operative to limit current flow through said coil while minimizing the time required to overcome the inductance of said coil.

16. A valve assembly as set forth in claim 14 further comprising selectively actuable latch means operative to retain said second valve member in said open position.

17. A valve assembly as set forth in claim 14 wherein said first valve member includes restricted passage means therethrough for providing said biasing fluid pressure from said supply of pressurized fluid.

18. In an air bag system for a motor vehicle including an inflatable bladder positioned within the passenger compartment, an improved actuating valve assembly for controlling inflation of said air bag comprising:

a housing having an inlet opening and first and second discharge openings provided therein;

a supply of pressurized fluid connected to said inlet opening;

a first valve member disposed within said housing and movable between a closed position wherein fluid communication between said inlet and said first discharge opening is prevented and a second position wherein said inlet and said first discharge opening are in fluid communication;

a pressurized fluid within said housing for biasing said first valve member into said closed position;

a second valve member disposed within said housing and being movable between a closed position wherein said second discharge opening is closed off and an open position wherein said second discharge passage is in fluid communication with said pressurized biasing fluid for venting same therethrough;

actuating means within said housing including a portion slidably connected to said second valve member, said portion being movable a predetermined distance to effect an initial cracking of said second valve member whereupon said biasing fluid pressure is operative to effect further movement of said second valve member in excess of said predetermined distance to said open position without affecting substantial further movement of said portion whereby said biasing fluid pressure is released through said second discharge opening and said first valve member is moved into said open position.

* * * * *

UNITED STATES PATENT AND TRADEMARK OFFICE
CERTIFICATE OF CORRECTION

PATENT NO. :       5,161,776

DATED      :       November 10, 1992

INVENTOR(S) :      Robert D. Nicholson

It is certified that error appears in the above-identified patent and that said Letters Patent is hereby corrected as shown below:

Column 3, line 9, "assemble" should be --assembly--.

Column 3, line 12, "sidwell" should be --sidewall--.

Column 7, line 14, Claim 1, after "provided" insert --therein--.

Column 7, line 44, Claim 3, after "therein" insert --,--.

Signed and Sealed this

Nineteenth Day of October, 1993

Attest:

BRUCE LEHMAN

Attesting Officer        Commissioner of Patents and Trademarks